UNITED STATES PATENT OFFICE.

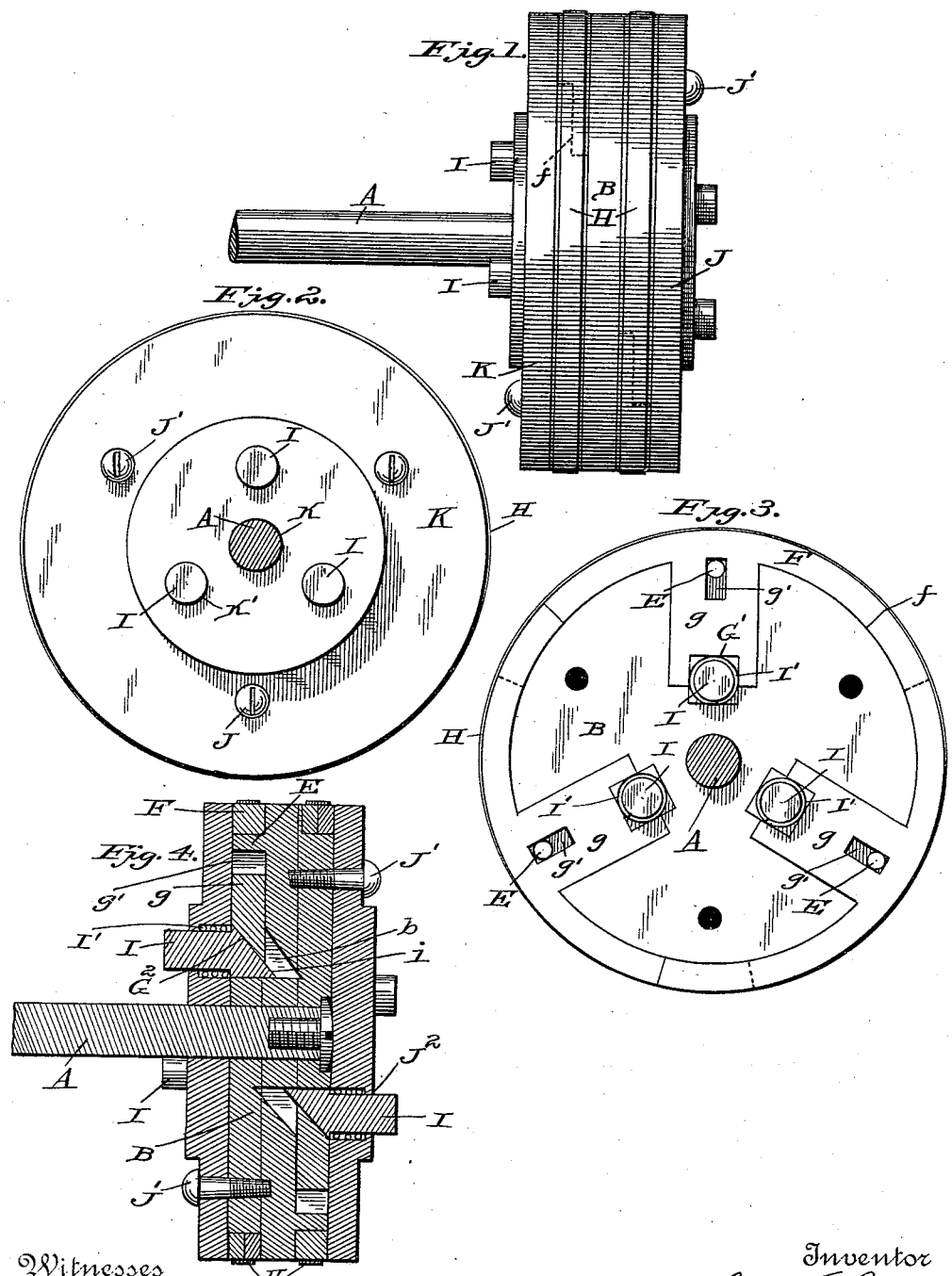

MATT F. ROSS, OF WINDFALL, INDIANA.

PISTON-HEAD.

SPECIFICATION forming part of Letters Patent No. 564,257, dated July 21, 1896.

Application filed January 10, 1896. Serial No. 574,994. (No model.)

*To all whom it may concern:*

Be it known that I, MATT F. ROSS, a citizen of the United States, residing at Windfall, in the county of Tipton and State of Indiana, have invented certain new and useful Improvements in Piston-Heads; and I do hereby declare the following to be a full, clear, and exact description of the invention, such as will enable others skilled in the art to which it appertains to make and use the same.

This invention relates to certain new and useful improvements in piston-heads, and it has for its object, among others, to provide a simple, cheap, and automatic piston-packing for steam-engines and the like.

It is well understood by engineers and others that in setting out piston-packing great care must be taken to have it neither too tight nor too loose, because if it is too tight the friction will be great, requiring considerable power to move the piston and probably cutting the cylinder or the packing of the piston-head. On the other hand, if it be too loose the steam will escape through, and thus power will be lost. It is my aim to provide a simple piston head and packing that will be automatic in its action.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a side elevation of my improved piston-head. Fig. 2 is an end view with the rod in section. Fig. 3 is a view with the follower-plate removed. Fig. 4 is a central longitudinal section through Fig. 1.

Like letters of reference indicate like parts in the several views.

Referring now to the details of the drawings by letter, A designates the piston-rod, which is secured to the piston-head or spider or body portion B, which has in its opposite faces and alternately arranged the tapered seats $b$ for the wedge portions of the pins, there being in this instance three upon each side of the piston-head, or what might perhaps be more properly called the "ring-seat." On opposite sides of this ring-seat and rigid therewith are the plates C, which have formed therein the radial grooves D, which at their inner ends are formed with the notches $c$, the inner walls of which are coincident with those of the tapered notches or recesses in the ring-seat, as shown. Projecting from the ring-seat, at the outer end of each of these radial grooves, is a pin E, and upon each side of the ring-seat is a ring F, formed in sections, three in number, with their ends halved out, so as to overlap, as seen at $f$, and each section is formed with a centrally-disposed inwardly-extending plate $g$, which has a longitudinal slot $g'$ and at its inner end a notch $G'$, the bottom wall of which is beveled, as seen at $G^2$.

The rings upon opposite sides of the ring-seat are alike in all particulars and operate in the same manner. Around the outer periphery of each of these rings may be an elastic band H, which serves to keep the ring-sections normally inward, so that their outer periphery is substantially flush with the periphery of the ring-seat.

I are pins having springs I' around their shanks and their inner ends beveled or wedge-shaped, as shown at $i'$, and with the wedge or tapered portion or wall thereof coincident with and resting upon the inclined wall of the notch at the inner end of the plate on the ring-sections.

J is a follower-plate having openings for the reception of the bolts J', which secure it to the piston-head or ring-seat, passing through the main portions of the plates upon the outer face of the ring-plate and having openings $J^2$ through which the pins pass.

K is a similar follower-plate having a central opening $k$ for the reception of the piston-rod and openings $k'$ through which extend the pins on this side of the piston-head. This follower-plate is secured in position in the same manner as the follower-plate on the other side.

With the parts constructed and arranged substantially as herein shown and described, the operation will be as follows: It is understood that the springs around the pins are held between the inner faces of the follower-plates and the shoulders on the pins adjacent to their wedge-shaped portions. The said pins which extend through the follower-plates have, say, one-half square inch of surface with a steam-pressure of, say, fifty pounds per square inch. At the beginning of the stroke there will be twenty-five pounds pressure against each of the pins. This would push the pins inward and expand the ring-sections, and when the pressure is less, less expansion is required. When the exhaust occurs and the piston is on its return stroke, there will be no pressure, practically, on the pins, and therefore no friction on the rings until the steam is again admitted. This action occurs every stroke of the piston back and forth. As the rings wear, the pins keep slipping in and adjust themselves until the rings are worn out, when they may be replaced by new ones. The pins will last an indefinite period.

It will be seen that a piston-head constructed in accordance with my invention never needs adjusting, but is automatic in its action, yet the same tension and a steam-tight piston is provided when the rings are about worn out as when they are new.

Modifications in detail may be resorted to without departing from the spirit of the invention or sacrificing any of its advantages.

Having thus described the invention, what is claimed as new is—

1. In a piston-head, the combination of the rod and the ring-seat, the ring and the pins having tapered portions engaging said rings to force them out through pressure of steam on the ends of said pins which extend through the follower-plate, and the springs acting on said pins substantially as described.

2. In a piston-head, the combination of the rod and the ring-seat, the ring and the pins having tapered portions engaging said rings to force them out through pressure of steam on the ends of said pins which extend through the follower-plate, and the springs acting on said pins said rings being made in sections.

3. In a piston, the combination of the ring-seat, the piston-rod secured thereto, the spider with tapered seats, the ring-sections and the pins having wedge-shaped inner ends, and springs acting on said pins, substantially as described.

4. In a piston, the combination of the ring-seat, the piston-rod secured thereto, the spider with tapered seats, the ring-sections and the pins having wedge-shaped inner ends, and springs around the shanks of said pins, and the follower-plates, substantially as described.

5. In a piston, the combination of the ring-seat, the piston-rod secured thereto, the spider with tapered seats, the ring-sections and the pins having wedge-shaped inner ends, and springs around the shanks of said pins and the follower-plates, having openings through which said pins extend, substantially as described.

6. The combination with the ring-seat and the plates upon opposite sides thereof having alternately-arranged tapered seats, of the rings in sections, with overlapping halved-out ends and radial plates with slots and notches with inclined walls, the pins working in the said slots and the pins having tapered inner ends seated against the inclined walls of the radial plates of the ring-sections with their outer ends working loosely through openings in the follower-plates and the springs around said pins, all substantially as described.

In testimony whereof I have signed this specification in the presence of two subscribing witnesses.

MATT F. ROSS.

Witnesses:
J. R. HILLDRUP,
J. M. PULLEY.